United States Patent
Pierson et al.

(10) Patent No.: US 11,058,056 B2
(45) Date of Patent: Jul. 13, 2021

(54) GANG ARM GAUGE WHEEL HEIGHT CONTROL FOR CROP HARVESTING DEVICE

(71) Applicant: Deere & Company, Moline, IL (US)

(72) Inventors: Joshua R. Pierson, East Moline, IL (US); Michael L. Vandeven, Princeton, IA (US); Jixin Chen, East Moline, IL (US); Eric Taflinger, East Moline, IL (US)

(73) Assignee: DEERE & COMPANY, Moline, IL (US)

( * ) Notice: Subject to any disclaimer, the term of this patent is extended or adjusted under 35 U.S.C. 154(b) by 175 days.

(21) Appl. No.: 16/403,688

(22) Filed: May 6, 2019

(65) Prior Publication Data
US 2020/0352101 A1    Nov. 12, 2020

(51) Int. Cl.
*A01D 41/14*      (2006.01)
*A01D 41/127*     (2006.01)
*A01D 41/06*      (2006.01)

(52) U.S. Cl.
CPC ........... *A01D 41/145* (2013.01); *A01D 41/06* (2013.01); *A01D 41/1274* (2013.01); *A01D 41/141* (2013.01)

(58) Field of Classification Search
CPC .... A01D 41/06; A01D 41/141; A01D 41/145; A01D 41/1274; A01D 75/28; A01D 75/285; A01D 75/287
USPC ......................................................... 56/208
See application file for complete search history.

(56) References Cited

U.S. PATENT DOCUMENTS

| | | | |
|---|---|---|---|
| 5,243,810 A | 9/1993 | Fox et al. | |
| 7,162,854 B2 | 1/2007 | Yeomans et al. | |
| 7,661,251 B1* | 2/2010 | Sloan | A01D 41/145 56/10.2 E |
| 7,971,420 B1 | 7/2011 | Bollin | |
| 8,025,312 B1 | 9/2011 | Honas et al. | |
| 8,245,489 B2 | 8/2012 | Talbot | |
| 9,775,291 B2 | 10/2017 | Neudorf | |
| 2014/0041351 A1* | 2/2014 | Bollin | A01D 41/141 56/10.2 E |
| 2015/0033692 A1* | 2/2015 | Schroeder | A01D 41/141 56/10.2 E |
| 2015/0271999 A1 | 10/2015 | Enns et al. | |
| 2018/0070531 A1* | 3/2018 | Long | A01D 41/127 |
| 2018/0098496 A1* | 4/2018 | Silver | A01D 41/06 |
| 2018/0310462 A1 | 11/2018 | Chen et al. | |

(Continued)

*Primary Examiner* — Thomas B Will
*Assistant Examiner* — Matthew Ian Neal
(74) *Attorney, Agent, or Firm* — Taft Stettinius & Hollister LLP; Stephen F. Rost

(57) ABSTRACT

A harvesting head for an agricultural harvester including a center frame section that is pivotally coupled to each of a left frame section and a right frame section. The elevation or height of the center frame section is determined by setting a height of the inner gauge wheels of the left and right frame sections. A gauge assembly for each of the left and right frame sections includes a linking member that spans between and operatively connects to outer and inner gauge wheels. The gauge assemblies are operably connected to the left and right frame sections to adjust an elevation of the outer and inner gauge wheels relative to the linking member to thereby adjust the elevation or height of the frame section when actuated by an actuation mechanism.

20 Claims, 6 Drawing Sheets

(56) References Cited

U.S. PATENT DOCUMENTS

2019/0029173 A1\* 1/2019 Noll ..................... A01D 41/127
2019/0200523 A1\* 7/2019 Fay, II ................. A01D 41/145
2020/0344950 A1\* 11/2020 Brimeyer ............. A01D 41/145

\* cited by examiner

GANG ARM GAUGE WHEEL HEIGHT CONTROL FOR CROP HARVESTING DEVICE

FIELD OF THE DISCLOSURE

The present disclosure relates to an agricultural harvesting head for an agricultural harvester, and in particular, to one or more gauge assemblies used with such agricultural harvesting heads to control gauge wheel position.

BACKGROUND OF THE DISCLOSURE

Traditionally, header gauge wheel systems consist of a single point of contact (or a pair very close together in the case of integrated transport systems) for each side of the harvesting head for an agricultural harvester or combine. This layout can be sufficient for rigid-frame headers, but can provide poor terrain following performance for winged or flex frame headers. A header frame consisting of a center frame, left header wing, and right header wing needs four points of contact with the ground to be stable; one on each wing and two on the center frame, or alternatively two points of contact on each wing. Traditionally, the harvester or combine provides the ground reference points for the center frame through an attachment frame, and each wing has a gauge wheel near the center of gravity. Vertical travel in the attachment frame causes the wings to pivot about the single point of ground contact, resulting in vertical motion at the wing tip, which can manifest as uneven cut heights as the harvester or combine snake across a field to harvest an agricultural crop or as is commonly known pass to pass. Disparities between a feederhouse set point on the feederhouse and a gauge wheel set point can exaggerate this.

SUMMARY

In one embodiment of the present disclosure, an agricultural harvesting head for an agricultural harvester comprising: a left frame section disposed to receive crop harvested on a left side of the agricultural harvesting head; a right frame section disposed to receive crop harvested on a right side of the agricultural harvesting head; a center frame section that is coupled to the left frame section and to the right frame section, the center frame section being disposed to receive crop harvested from the left frame section and from the right frame section; a gauge assembly operably connected to at least one of the left frame section and the right frame section, the gauge assembly including: a linking member that spans between and operatively connects to an outer gauge wheel and to an inner gauge wheel, the linking member supported on the at least one of the left and right frame sections in a manner that enables actuation of the linking member to correspondingly adjust an elevation of at least one of the outer gauge wheel and the inner gauge wheel relative to the linking member to thereby adjust an elevation of the at least one of the left and right frame sections; an outer gauge wheel operably connected to the linking member, the outer gauge wheel positioned outwardly from the center frame section; an inner gauge wheel operably connected to the linking member, the inner gauge wheel positioned inwardly closer to the center frame section; and an actuation mechanism mounted on the at least one of the left and the right frame sections and operably connected to the linking member to thereby actuate the linking member.

In one example of this embodiment, the gauge assembly is a left gauge assembly operably connected to the left frame section, and further comprising: a right gauge assembly operably connected to the right frame section, the right gauge assembly including: a linking member that spans between and operatively connects to an outer gauge wheel and to an inner gauge wheel, the linking member supported on the right frame section in a manner that enables actuation of the linking member to correspondingly adjust an elevation of at least one of the outer gauge wheel and the inner gauge wheel relative to the linking member to thereby adjust an elevation of the right frame section; an outer gauge wheel operably connected to the linking member, the outer gauge wheel positioned outwardly from the center frame section; an inner gauge wheel operably connected to the linking member, the inner gauge wheel positioned closer to the center frame section; and an actuation mechanism mounted on the right frame section and operably connected to the linking member to thereby actuate the linking member.

In a further example of this embodiment, the center frame section is pivotally connected to both of the left and right frame sections.

In yet a further example of this embodiment, an elevation of the center frame section is determined by the elevation of the inner gauge wheels of the right and the left gauge assemblies.

In another example of this embodiment, the actuation mechanism includes one of a hydraulic cylinder or a linear actuator.

In another example of this embodiment, the linking member includes a horizontal member configured so as to resist tensile or compressive forces. In a further example of this embodiment, the linking member includes an outer crank arm operably attached to the outer gauge wheel and the horizontal member to impart a vertical force to the outer gauge wheel to move the outer gauge wheel, the linking member also includes an inner crank arm operably attached to the inner gauge wheel and the horizontal member to impart a vertical force to the inner gauge wheel to move the inner gauge wheel.

In a further example of this embodiment, the gauge assembly includes a sensor supported on the corresponding left or right frame section for sensing a distance of the corresponding linking member relative to the outer gauge wheel on the ground surface and the sensor configured to sense a distance of the corresponding linking member relative to the inner gauge wheel on the ground surface; and further comprising: a controller configured to actuate the linking member to correspondingly adjust the distance of at least one of the outer gauge wheel and the inner gauge wheel on the ground surface relative to the corresponding linking member.

In a second embodiment of the present disclosure, an agricultural harvesting head for an agricultural harvester comprising: a left frame section disposed to receive crop harvested on a left side of the agricultural harvesting head; a right frame section disposed to receive crop harvested on a right side of the agricultural harvesting head; a center frame section that is coupled to the left frame section and to the right frame section, the center frame section being disposed to receive crop harvested from the left frame section and from the right frame section, the elevation of the center frame section being determined by the elevation of the left and right frame sections; a left gauge assembly operably connected to the left frame section, the left gauge assembly including a left linking member that spans between and operatively connects to an outer gauge wheel and to an inner gauge wheel, wherein actuation of the left linking member correspondingly adjusts an elevation of at least one of the outer gauge wheel and the inner gauge wheel relative to the left linking member to thereby adjust an elevation of the left frame section; and a right gauge assembly operably connected to the right frame section, the right gauge assembly including a right linking member that spans between and operatively connects to an outer gauge wheel and to an inner gauge wheel, wherein actuation of the right linking member correspondingly adjusts an elevation of at least one of the outer gauge wheel and the inner gauge wheel relative to the right linking member to thereby adjust an elevation of the right frame section.

In a second example of this embodiment, the center frame section is pivotally connected to both of the left and right frame sections.

In a third example of this embodiment, the left gauge assembly includes an actuation mechanism mounted on the left frame section and operably connected to the left linking member to thereby actuate the left linking member, and the right gauge assembly includes an actuation mechanism mounted on the right frame section and operably connected to the right linking member to thereby actuate the right linking member.

In a fourth example of this embodiment, both of the left and right linking members include an outer crank arm operably attached to the outer gauge wheel and the horizontal member to impart a vertical force to the outer gauge wheel to move the outer gauge wheel vertically, and both of the left and right linking members also include an inner crank arm operably attached to the inner gauge wheel and the horizontal member to impart a vertical force to the inner gauge wheel to move the inner gauge wheel vertically, when the horizontal member is actuated.

In a fifth example of this embodiment, the left gauge assembly includes a sensor supported on the left frame section for sensing a distance of the left linking member relative to the outer gauge wheel on the ground surface and the sensor configured to sense a distance of the left linking member relative to the inner gauge wheel on the ground surface; wherein the right gauge assembly includes a sensor supported on the right frame section for sensing a distance of the right linking member relative to the outer gauge wheel on the ground surface and the sensor configured to sense a distance of the right linking member relative to the inner gauge wheel on the ground surface; and further comprising: a controller configured to actuate the left linking member to correspondingly adjust the distance of at least one of the outer gauge wheel and the inner gauge wheel on the ground surface relative to the left linking member, the controller configured to actuate the right linking member to correspondingly adjust the distance of at least one of the outer gauge wheel and the inner gauge wheel on the ground surface relative to the right linking member.

In a third embodiment of the present disclosure, a method comprises operating an agricultural harvesting head for an agricultural harvester, the harvesting head having a left frame section disposed to receive crop harvested on a left side of the agricultural harvesting head, a right frame section disposed to receive crop harvested on a right side of the agricultural harvesting head, a center frame section that is coupled to the left frame section and the right frame section, the center frame section being disposed to receive crop harvested from the left frame section and from the right frame section, a left gauge assembly operably connected to the left frame section, the left gauge assembly having an outer gauge wheel operably connected to an inner gauge wheel wherein the outer gauge wheel is positioned outwardly from the center frame section and the inner gauge wheel is positioned closer to the center frame section, a right gauge assembly operably connected to the right frame section, the right gauge assembly having an outer gauge wheel operably connected to an inner gauge wheel wherein the outer gauge wheel is positioned outwardly from the center frame section and the inner gauge wheel is positioned closer to the center frame section; determining a desired height of the outer gauge wheels and a desired height of the inner gauge wheels; detecting an operational height of the outer gauge wheels and an operational height of the inner gauge wheels; and actuating at least one of the left gauge assembly and the right gauge assembly to vertically move the outer gauge wheels and the inner gauge wheels from the operational height to the desired height to thereby adjust an elevation of the corresponding left or right frame section and the center frame section.

In a first example of this embodiment, further comprising: operating the left gauge assembly independently from the right gauge assembly.

In a second example of this embodiment, further comprising: wherein both of the left and right linking members include an outer crank arm operably attached to the outer gauge wheel and a horizontal member to impart a vertical force to the outer gauge wheel to move the outer gauge wheel vertically, and both of the left and right linking members also include an inner crank arm operably attached to the inner gauge wheel and the horizontal member to impart a vertical force to the inner gauge wheel to move the inner gauge wheel vertically, wherein during the actuating step includes moving the horizontal member to actuate the outer and inner crank arms.

In a third example of this embodiment, further comprising: adjusting an elevation of the center frame section by vertically moving at least one of the inner gauge wheels, wherein the center frame section is pivotally connected to both of the left and right frame sections.

In a fourth example of this embodiment, wherein the left gauge assembly includes a left linking member that spans between and operatively connects to the outer gauge wheel and to the inner gauge wheel, an actuation mechanism mounted on the left frame section and operably connected to the left linking member to thereby actuate the left linking member to correspondingly adjust a vertical height of at least one of the outer gauge wheel and the inner gauge wheel relative to the left linking member, wherein the right gauge assembly includes a right linking member that spans between and operatively connects to the outer gauge wheel and to the inner gauge wheel, an actuation mechanism mounted on the right frame section and operably connected to the right linking member to thereby actuate the right linking member to correspondingly adjust a height of at least one of the outer gauge wheel and the inner gauge wheel relative to the right linking member; wherein the actuating at least one of the left gauge assembly and the right gauge assembly includes operating the corresponding actuation mechanism to move the corresponding one of the left linking member or the right linking member.

In a fifth example of this embodiment, wherein both of the left and right linking members include an outer crank arm operably attached to the outer gauge wheel and the horizontal member, and both of the left and right linking members also include an inner crank arm operably attached to the inner gauge wheel and the horizontal member; and actuating the horizontal members to impart a vertical force to the outer gauge wheel to move the outer gauge wheel vertically and to impart a vertical force to the inner gauge wheel to move the inner gauge wheel vertically.

In a sixth example of this embodiment, wherein the left gauge assembly includes a sensor supported on the left frame section for sensing a change in elevation of the outer gauge wheel and the inner gauge wheel relative to the left linking member, the right gauge assembly includes a sensor supported on the right frame section for sensing a change in elevation of the outer gauge wheel and the inner gauge wheel relative to the right linking member; and further comprising: detecting the change in elevation by a controller connected to the sensors; and actuating at least one of the left and the right linking members to correspondingly adjust the elevation of at least one of the outer gauge wheel and the inner gauge wheel relative to the left and the right linking members.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference characters indicate corresponding parts throughout the several view. The exemplifications set out herein illustrate embodiments of the invention, and such exemplifications are not to be construed as limiting the scope of the invention in any manner.

DETAILED DESCRIPTION

Figure 1:
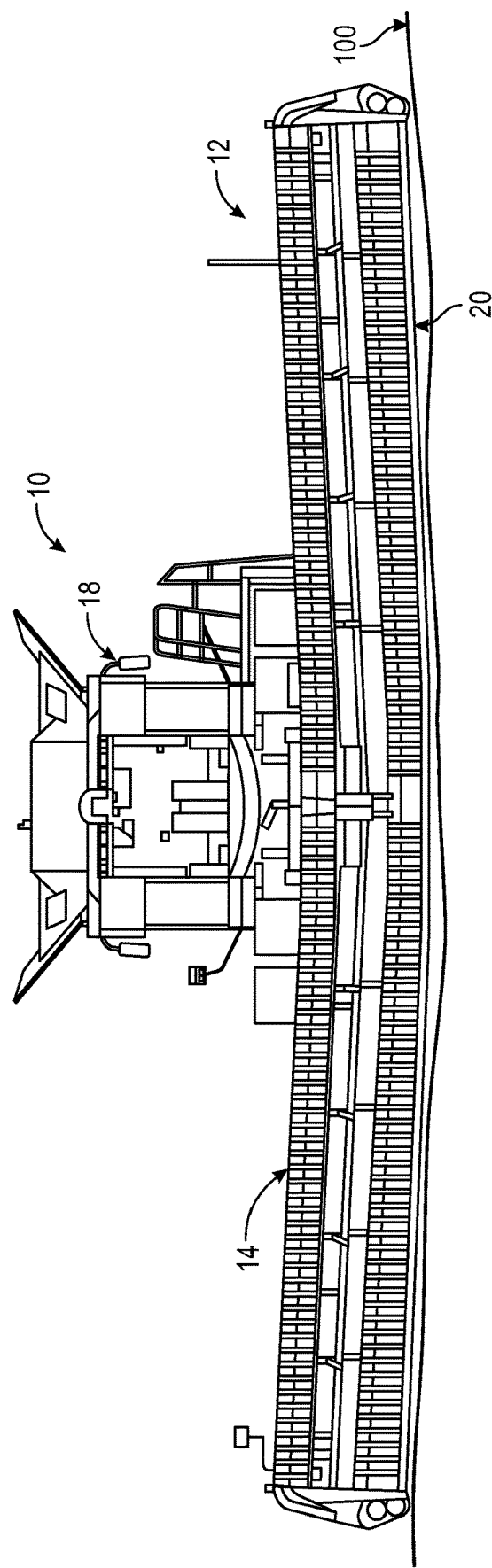
FIG. 1 is a front view of an exemplary agricultural harvester in a first exemplary configuration.
Figure 2:
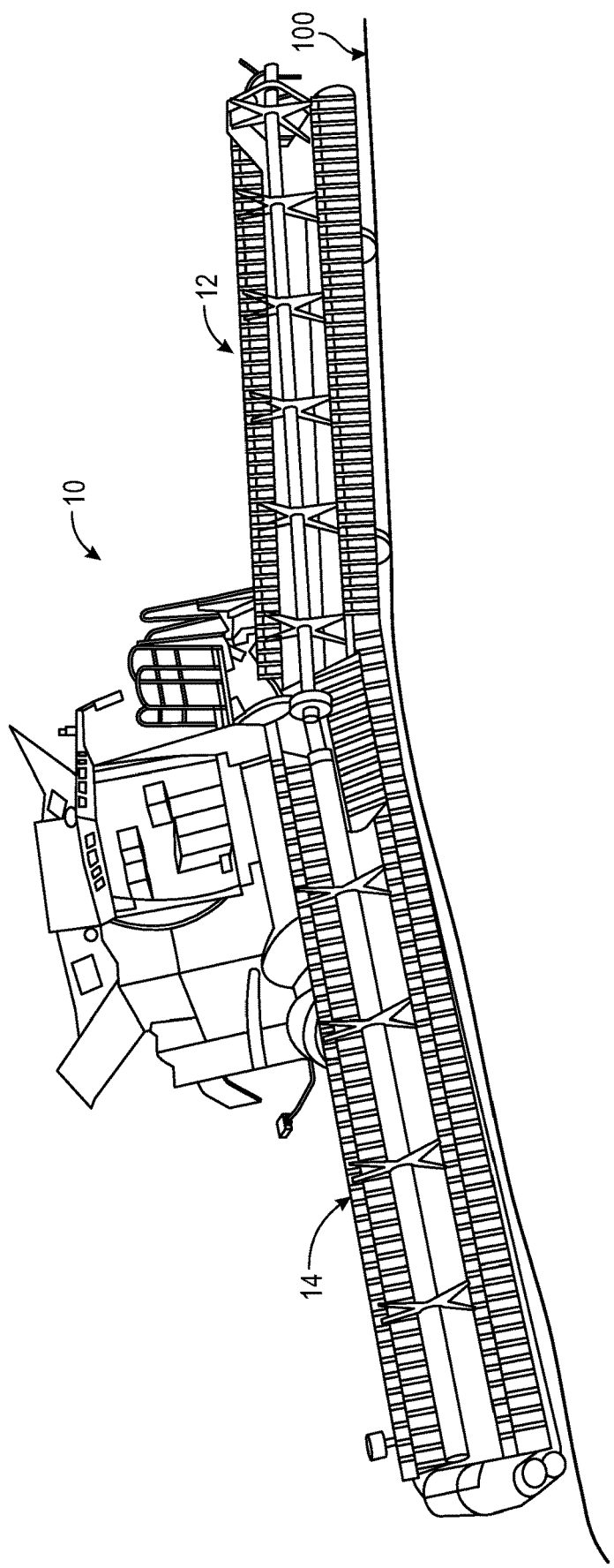
FIG. 2 is a front view of the exemplary agricultural harvester of FIG. 1 in a second exemplary configuration.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Referring to FIG. 1 of the present disclosure, an agricultural harvester 10 is shown with an agricultural harvesting head or header 11 that is formed in a number of sections which are independently pivotal each relative to the next. The illustrated embodiment includes three sections that includes a left frame section 12, a right frame section 14, and a center frame section 16 positioned between and coupled to the left and right frame sections 12 and 14. The center frame section 16 is pivotally connected to the left frame section 12 via a first hinge 15. The center frame section 16 is pivotally connected to the right frame section 14 via a second hinge 17. As described in more detail below, the elevation of the center frame section 16 is determined by the elevation of inner gauge wheels associated with the left and the right frame sections 12 and 14.

The forward operating direction of the harvester 10 determines the "left" side of the harvester 10 and left frame section 12 and also similarly determines the "right" side of the harvester 10 and the right frame section 14. The operation of the harvester 10 is controlled from an operator's cab 18. The operator's cab 18 may include any number of controls (not shown) for controlling the operation of the harvester 10. A controller (not shown) may be electrically coupled to the plurality of controls, and the controller may control the functionality of the harvester 10 and including a left gauge assembly 30 and a right gauge assembly 130.

Moreover, a user interface (not shown) may be disposed in the operator's cab 18. The user interface may include a display (not shown) for displaying various characteristics of the harvester 10 such as, but not limited to, speed, fluid temperatures, fluid pressures, direction of travel, etc. The display may be a touchscreen display that allows the operator to control certain functions of the machine and implement (e.g., the left gauge assembly 30 and the right gauge assembly 130) by touching a button on the display. Other uses of the user interface may be available and this disclosure is not intended to be limited in any way with respect to the functionality of the operator controls or user interface.

As described above, the user interface (not shown) may also include controls for controlling movement of the left or right frame sections 12 and 14, adjusting gang angle of one of the gang assemblies, etc.

A cutterbar 20 is disposed at a forward end of the harvester 10 and is used in order to harvest and cut crop such as wheat or corn. The cutterbar 20 is split at a junction lying along the axis of a first hinged connection between the left and center frame sections 12 and 16 and along the axis of a second hinged connection between the right and center frame sections 14 and 16 so as to provide two pivots within the cutterbar 20 thereby allowing the cutterbar 20 to bend at these junctions.

Figure 3:
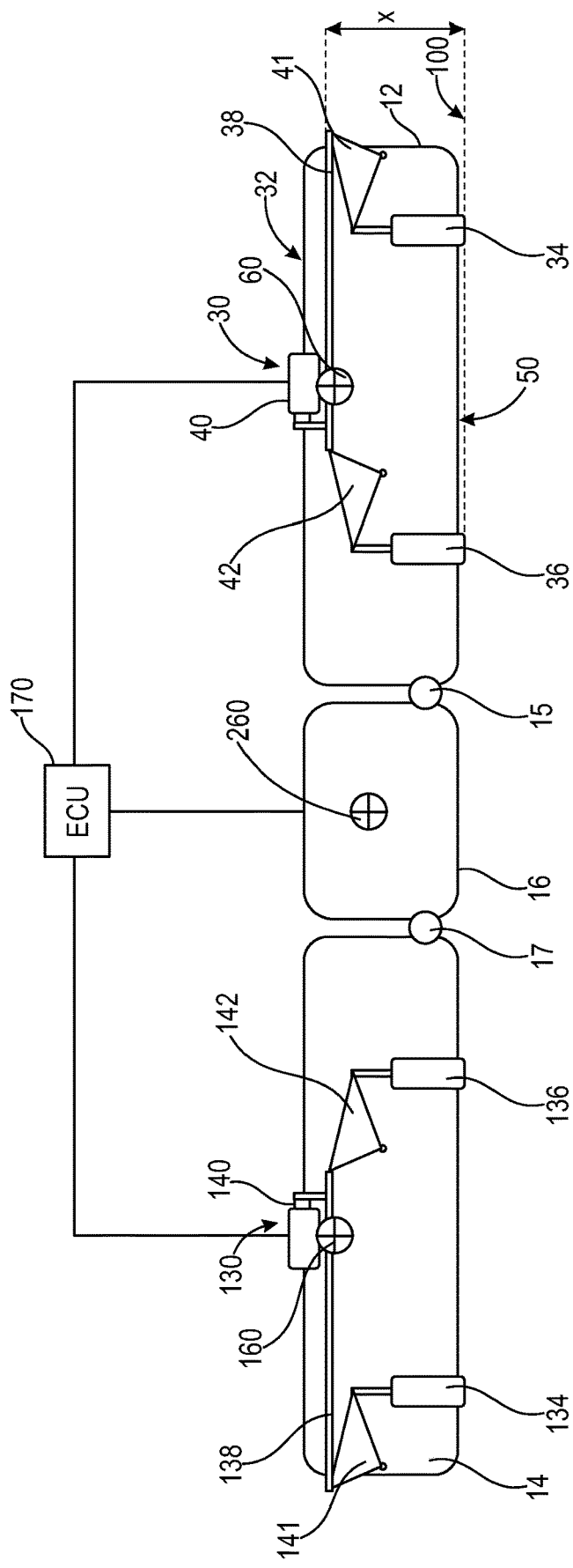
FIG. 3 is a bottom schematic view of a right gauge assembly and a left gauge assembly for the harvesting head of FIG. 1 in a fully retracted configuration.
Figure 4:
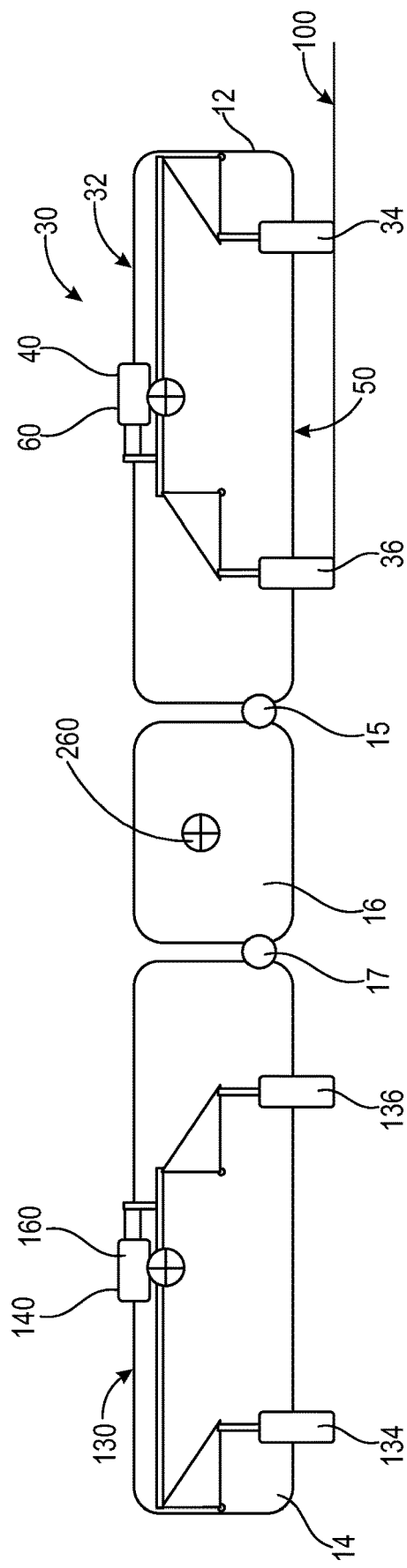
FIG. 4 is a bottom schematic view of the right gauge assembly and the left gauge assembly for the harvesting head of FIG. 1 in a partially extended configuration.
Figure 5:
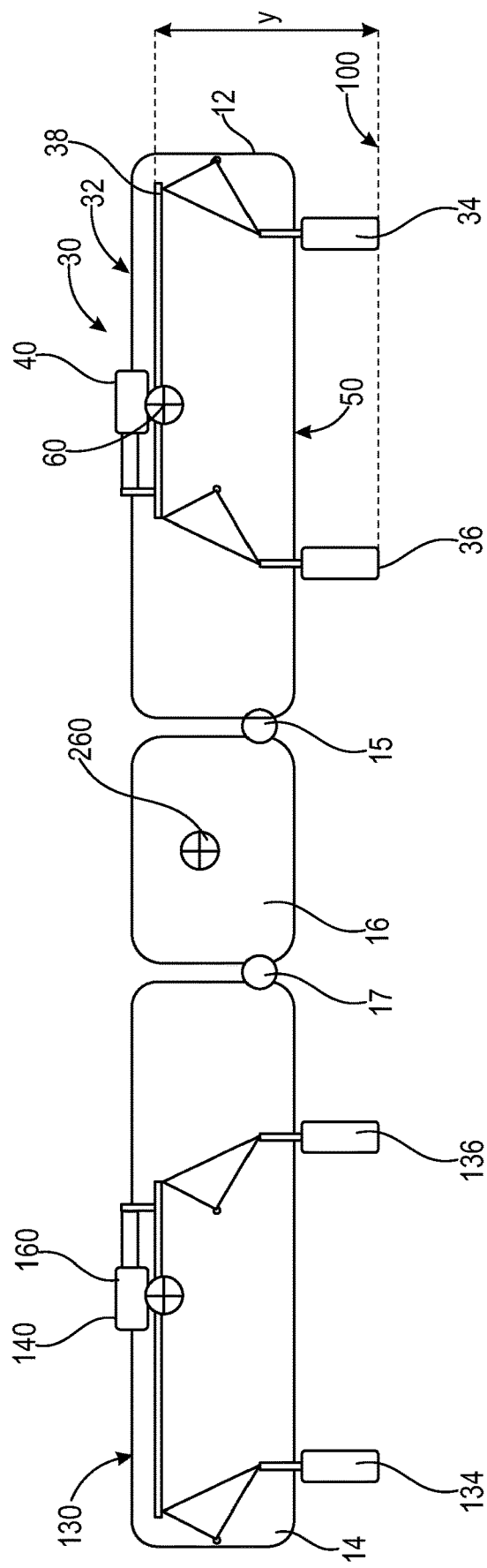
FIG. 5 is a bottom schematic view of the right gauge assembly and the left gauge assembly for the harvesting head of FIG. 1 in a fully extended configuration.

Referring to FIGS. 3, 4, and 5, the harvester 10 includes a left gauge assembly 30 operably connected to the left frame section 12. The left gauge assembly 30 includes a left linking member 32 that spans between and operatively connects to an outer gauge wheel 34 and to an inner gauge wheel 36. The left linking member 32 is operably supported on the left frame section 12. Actuation of the left linking member 32 correspondingly adjusts an elevation of at least one of the outer gauge wheel 34 and the inner gauge wheel 36 or adjusts the elevation of both of the outer and inner gauge wheels 34 and 36 relative to the left linking member 32. The left linking member 32 includes a horizontal member 38 configured to resist tensile or compressive forces. Some examples of the horizontal member 38 include a small beam or truss member. The left linking member 32 includes an outer crank arm 41 operably attached to both of the outer gauge wheel 34 and the horizontal member 38 to impart a vertical force to the outer gauge wheel 34 to thereby move the outer gauge wheel 34 vertically either closer to the horizontal member 38 or further away from the horizontal member 38. The left linking member 32 also includes an inner crank arm 42 operably attached to both of the inner gauge wheel 36 and the horizontal member 38 to impart a vertical force to the inner gauge wheel 36 to thereby move the inner gauge wheel 36 vertically. Some non-limiting examples of the outer and inner crank arms 41 and 42 include a rocker, a cam linkage, or some other pivotable or rotatable joint.

The outer gauge wheel 34 is operably connected to the horizontal member 38 via the outer crank arm 41 such that actuation of the horizontal member 38 causes rotation of the outer crank arm 41 which in turn causes the outer gauge wheel 34 to move vertically up or down to adjust the elevation or height of the outer gauge wheel 34 relative to the horizontal member 38. The outer gauge wheel 34 is positioned on the left frame section 12 outwardly or furthest from the center frame section 16 as compared to the inner gauge wheel 36. The inner gauge wheel 36 is operably connected to the horizontal member 38 via the inner crank arm 42 such that actuation of the horizontal member 38 causes rotation of the inner crank arm 42 which in turn causes the inner gauge wheel 36 to move vertically up or down to adjust the elevation or height of the inner gauge wheel 36 relative to the horizontal member 38. The inner gauge wheel 36 is positioned inwardly closer to the center frame section 16 as compared to the outer gauge wheel 34.

The left gauge assembly 30 includes an actuation mechanism 40 mounted on the left frame section 12 and operably connected to the left linking member 32 and specifically the horizontal member 38. The actuation mechanism 40 can include a hydraulic cylinder, a linear actuator or any other device that can be actuated to engage and move the left linking member 32 and the horizontal member 38. Alternatively, the left gauge assembly 30 may not include the actuation mechanism 40 and is instead manually actuated and then locked into place. Illustrated in FIG. 3, the actuation mechanism 40 is not actuated and is in a fully retracted position such that the left linking member 32 and the outer and inner gauge wheels 34 and 36 are in a fully retracted position wherein the outer and inner gauge wheels 34 and 36 are very close to the left linking member 32 as measured by X and the left frame section 12 is closest to the ground surface 100. Illustrated in FIG. 4, the actuation mechanism 40 is partially actuated so the left linking member 32 and the outer and inner gauge wheels 34 and 36 are in a partially extended position and there is a greater distance between the left linking member 32 and the outer and inner gauge wheels 34 and 36 as compared to the embodiment illustrated in FIG. 3. Additionally in FIG. 4, the left frame section 12 is positioned slightly higher as measured relative to the ground surface 100 as compared to FIG. 3. Illustrated in FIG. 5, the actuation mechanism 40 is fully actuated so the left linking member 32 and the outer and inner gauge wheels 34 and 36 are in a fully extended position and there is the greatest distance between the left linking member 32 and the outer and inner gauge wheels 34 and 36 as measured by Y and the left frame section 12 is positioned at its highest height compared to the ground surface 100.

The left gauge assembly 30 includes a sensor 60 supported on the left frame section 12 for sensing a distance of the left linking member 32 relative to the outer gauge wheel 34 and the inner gauge wheel 36 on the ground surface 100. The sensor 60 can be mounted on any location of the left gauge assembly 30 such as the left linking member 32 including the horizontal member 38, the outer crank arm 41, and the inner crank arm 42 or can be mounted on the left frame section 12.

Referring to FIGS. 3, 4, and 5, the harvester 10 includes a right gauge assembly 130 operably connected to the right frame section 14 wherein the right gauge assembly 130 is similar to the left gauge assembly 30 and includes the same parts and operates the same or as a mirror image as the left gauge assembly 30 therefore for the sake of brevity will not be described again. The right gauge assembly 130 is operable independent from the left gauge assembly 30 therefore the adjustment of the right frame section 14 is independent of the left frame section 12.

Referring to FIGS. 3, 4, and 5, the harvester 10 includes a sensor 260 supported on the center frame section 16 for sensing a distance of the center frame section 16 relative to the inner gauge wheels 36 on the ground surface 100 of the left and right frame sections 12 and 14.

The harvester 10 includes a controller 170 that is operatively connected to the sensor 60, a sensor 160 of the right frame section 14, and the sensor 260 and is arranged to receive a corresponding height signal from the sensors 60, 160, and 260. Based on the height signal received from the sensor 60, the controller is configured to actuate the actuation mechanism 40 which in turn actuates the left linking member 32 to cause the outer crank arm 41 and the inner crank arm 42 to rotate and impart a vertical force to the outer gauge wheel 34 and to the inner gauge wheel 36 causing the distance of outer gauge wheel 34 and the inner gauge wheel 36 on the ground surface 100 relative to the left linking member 32 to vertically increase to raise the left frame section 12 relative to the ground surface 100 or decrease the height of the left frame section 12 relative to the ground surface 100. As such, the left frame section 12 will be raised or lowered vertically.

Based on the height signal received from the sensor 160, the controller 170 is configured to actuate the actuation mechanism 140 which in turn actuates the right linking member 138 to cause the outer crank arm 141 and the inner crank arm 142 to rotate and impart a vertical force to the outer gauge wheel 134 and to the inner gauge wheel 136 causing the distance of outer gauge wheel 134 and the inner gauge wheel 136 on the ground surface 100 relative to the right linking member 138 to vertically increase to raise the right frame section 14 relative to the ground surface 100 or vertically decrease the height of the right frame section 14 relative to the ground surface 100 if the vertical force decreases. As such, the right frame section 14 will be raised or lowered vertically.

Figure 6:
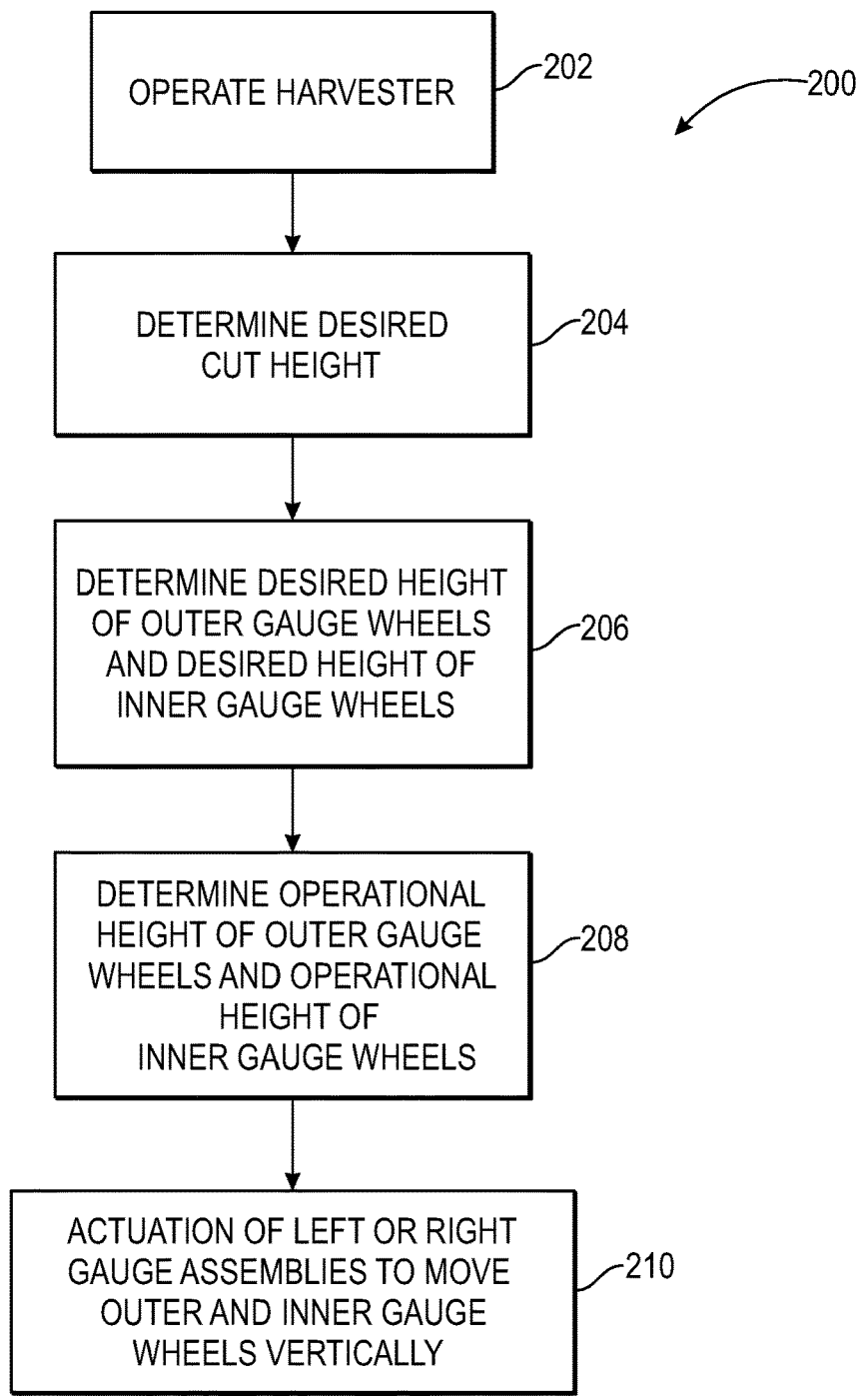
FIG. 6 is a flow diagram of a procedure of adjusting the right gauge assembly and the left gauge assembly for the harvesting head of FIG. 1.

With reference to FIG. 6, is a flow diagram of a procedure 200 for adjusting an elevation of the left frame section 12, the right frame section 14, and the center frame section 16 of the embodiment of FIG. 3. Procedure 200 begins at operation 202 to operate the harvester 10. Procedure 200 continues at operation 204 in which a desired cut height of agricultural crop is determined by an operator for a designated field. Procedure 200 continues at operation 206 to determine a desired height of the outer gauge wheels 34, 134 and a desired height of the inner gauge wheels 36, 136 based on the operation 204 that determines the desired cut height of the agricultural crop.

Procedure 200 continues at operation 208 in which the sensors 60, 160, and 260, detect an operational height of the outer gauge wheels 34, 134 and an operational height of the inner gauge wheels 36, 136 and communicate the operational height signal to the controller 170.

Procedure 200 continues at operation 210 in which the controller 170 actuates the actuation mechanisms 40, 140 which in turn actuates at least one of the left gauge assembly 30 and the right gauge assembly 130 to vertically move the outer gauge wheels 34, 134 and the inner gauge wheels 36, 136 from the operational height to the desired height to thereby adjust an elevation of the corresponding left and/or right frame sections 12 and 14 and the center frame section 16. During operation 210 the actuation mechanism 40, 140 actuates one or both of the horizontal members 38, 138 to move horizontally to actuate the outer crank arms 41, 141 to impart a vertical force to the outer gauge wheels 34, 134 to move the outer gauge wheels 34, 134 vertically. The horizontal movement of horizontal members 38, 138 also actuates the inner crank arms 42, 142 operably attached to the inner gauge wheels 36, 136 to impart a vertical force to the inner gauge wheels 36, 136 to move the inner gauge wheels 36, 136 vertically. By vertically moving the outer gauge wheels 34, 134 and the inner gauge wheels 36, 136, the height of the left and right frame sections 12 and 14 is adjusted. The controller 170 can actuate and operate the left gauge assembly 30 independently from the right gauge assembly 130 such that the height of either of the left or right frame sections 12 and 14 can be adjusted independently of the other one. Since the center frame section 16 is pivotally connected to both of the left and right frame sections 12 and 14, an elevation or height of the center frame section 16 is adjusted by vertically moving at least one of the inner gauge wheels 36, 136.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural harvesting head for an agricultural harvester comprising:
   a left frame section disposed to receive crop harvested on a left side of the agricultural harvesting head;
   a right frame section disposed to receive crop harvested on a right side of the agricultural harvesting head;
   a center frame section that is coupled to the left frame section and to the right frame section, the center frame section being disposed to receive crop harvested from the left frame section and from the right frame section;
   a gauge assembly operably connected to at least one of the left frame section and the right frame section, the gauge assembly including:
      a linking member that spans between and operatively connects to an outer gauge wheel and to an inner gauge wheel, the linking member is a horizontal member that is supported on the at least one of the left and right frame sections in a manner that enables actuation of the linking member to correspondingly adjust an elevation of at least one of the outer gauge wheel and the inner gauge wheel relative to the linking member to thereby adjust an elevation of the at least one of the left and right frame sections;
      an outer gauge wheel operably connected to the linking member, the outer gauge wheel positioned outwardly from the center frame section;
      an inner gauge wheel operably connected to the linking member, the inner gauge wheel positioned inwardly closer to the center frame section; and
      an actuation mechanism mounted on the at least one of the left and the right frame sections and operably connected to the linking member to thereby actuate the linking member.

2. The agricultural harvesting head of claim 1, wherein the gauge assembly is a left gauge assembly operably connected to the left frame section, and further comprising:
   a right gauge assembly operably connected to the right frame section, the right gauge assembly including:
      a linking member that spans between and operatively connects to an outer gauge wheel and to an inner gauge wheel, the linking member supported on the right frame section in a manner that enables actuation of the linking member to correspondingly adjust an elevation of at least one of the outer gauge wheel and the inner gauge wheel relative to the linking member to thereby adjust an elevation of the right frame section;
      an outer gauge wheel operably connected to the linking member, the outer gauge wheel positioned outwardly from the center frame section;
      an inner gauge wheel operably connected to the linking member, the inner gauge wheel positioned closer to the center frame section; and
      an actuation mechanism mounted on the right frame section and operably connected to the linking member to thereby actuate the linking member.

3. The agricultural harvesting head of claim 2, wherein the center frame section is pivotally connected to both of the left and right frame sections.

4. The agricultural harvesting head of claim 2, wherein an elevation of the center frame section is determined by the elevation of the inner gauge wheels of the right and the left gauge assemblies.

5. The agricultural harvesting head of claim 1, wherein the actuation mechanism includes one of a hydraulic cylinder or a linear actuator.

6. The agricultural harvesting head of claim 1, wherein the horizontal member is configured so as to resist tensile or compressive forces.

7. The agricultural harvesting head of claim 6, wherein the gauge assembly includes an outer crank arm operably attached to the outer gauge wheel and the horizontal member to impart a vertical force to the outer gauge wheel to move the outer gauge wheel, the gauge assembly also includes an inner crank arm operably attached to the inner gauge wheel and the horizontal member to impart a vertical force to the inner gauge wheel to move the inner gauge wheel.

8. The agricultural harvesting head of claim 1, wherein the gauge assembly includes a sensor supported on the corresponding left or right frame section for sensing a distance of the corresponding linking member relative to the outer gauge wheel on the ground surface and the sensor configured to sense a distance of the corresponding linking member relative to the inner gauge wheel on the ground surface; and further comprising:

a controller configured to actuate the linking member to correspondingly adjust the distance of at least one of the outer gauge wheel and the inner gauge wheel on the ground surface relative to the corresponding linking member.

9. An agricultural harvesting head for an agricultural harvester comprising:
   a left frame section disposed to receive crop harvested on a left side of the agricultural harvesting head;
   a right frame section disposed to receive crop harvested on a right side of the agricultural harvesting head;
   a center frame section that is coupled to the left frame section and to the right frame section, the center frame section being disposed to receive crop harvested from the left frame section and from the right frame section, the elevation of the center frame section being determined by the elevation of the left and right frame sections;
   a left gauge assembly operably connected to the left frame section, the left gauge assembly including a left linking member that spans horizontally between and operatively connects to an outer gauge wheel and to an inner gauge wheel, wherein actuation of the left linking member correspondingly adjusts an elevation of at least one of the outer gauge wheel and the inner gauge wheel relative to the left linking member to thereby adjust an elevation of the left frame section; and
   a right gauge assembly operably connected to the right frame section, the right gauge assembly including a right linking member that spans horizontally between and operatively connects to an outer gauge wheel and to an inner gauge wheel, wherein actuation of the right linking member correspondingly adjusts an elevation of at least one of the outer gauge wheel and the inner gauge wheel relative to the right linking member to thereby adjust an elevation of the right frame section.

10. The agricultural harvesting head of claim 9, wherein the center frame section is pivotally connected to both of the left and right frame sections.

11. The agricultural harvesting head of claim 9, wherein the left gauge assembly includes an actuation mechanism mounted on the left frame section and operably connected to the left linking member to thereby actuate the left linking member, and the right gauge assembly includes an actuation mechanism mounted on the right frame section and operably connected to the right linking member to thereby actuate the right linking member.

12. The agricultural harvesting head of claim 9, wherein both of the left and right gauge assemblies include an outer crank arm operably attached to the respective outer gauge wheel and the respective linking member to impart a vertical force to the outer gauge wheel to move the outer gauge wheel vertically, and both of the left and right gauge assemblies also include an inner crank arm operably attached to the respective inner gauge wheel and the respective linking member to impart a vertical force to the inner gauge wheel to move the inner gauge wheel vertically, when the respective linking member is actuated.

13. The agricultural harvesting head of claim 9, wherein the left gauge assembly includes a sensor supported on the left frame section for sensing a distance of the left linking member relative to the outer gauge wheel on the ground surface and the sensor configured to sense a distance of the left linking member relative to the inner gauge wheel on the ground surface;
   wherein the right gauge assembly includes a sensor supported on the right frame section for sensing a distance of the right linking member relative to the outer gauge wheel on the ground surface and the sensor configured to sense a distance of the right linking member relative to the inner gauge wheel on the ground surface; and
further comprising:
a controller configured to actuate the left linking member to correspondingly adjust the distance of at least one of the outer gauge wheel and the inner gauge wheel on the ground surface relative to the left linking member, the controller configured to actuate the right linking member to correspondingly adjust the distance of at least one of the outer gauge wheel and the inner gauge wheel on the ground surface relative to the right linking member.

14. A method comprising:
operating an agricultural harvesting head for an agricultural harvester, the harvesting head having a left frame section disposed to receive crop harvested on a left side of the agricultural harvesting head, a right frame section disposed to receive crop harvested on a right side of the agricultural harvesting head, a center frame section that is coupled to the left frame section and the right frame section, the center frame section being disposed to receive crop harvested from the left frame section and from the right frame section, a left gauge assembly operably connected to the left frame section, the left gauge assembly having an outer gauge wheel operably connected to an inner gauge wheel wherein the outer gauge wheel is positioned outwardly from the center frame section and the inner gauge wheel is positioned closer to the center frame section, a right gauge assembly operably connected to the right frame section, the right gauge assembly having an outer gauge wheel operably connected to an inner gauge wheel wherein the outer gauge wheel is positioned outwardly from the center frame section and the inner gauge wheel is positioned closer to the center frame section;
determining a desired height of the outer gauge wheels and a desired height of the inner gauge wheels;
detecting an operational height of the outer gauge wheels and an operational height of the inner gauge wheels; and
actuating at least one of the left gauge assembly and the right gauge assembly to vertically move the outer gauge wheels and the inner gauge wheels from the operational height to the desired height to thereby adjust an elevation of the corresponding left or right frame section and the center frame section.

15. The method of claim 14, further comprising:
operating the left gauge assembly independently from the right gauge assembly.

16. The method of claim 14, further comprising:
wherein both of the left and right gauge assemblies include an outer crank arm operably attached to the outer gauge wheel and a horizontal member to impart a vertical force to the outer gauge wheel to move the outer gauge wheel vertically, and both of the left and right gauge assemblies also include an inner crank arm operably attached to the inner gauge wheel and the horizontal member to impart a vertical force to the inner gauge wheel to move the inner gauge wheel vertically, wherein during the actuating step includes moving the horizontal member to actuate the outer and inner crank arms.

17. The method of claim 14, further comprising:
adjusting an elevation of the center frame section by vertically moving at least one of the inner gauge wheels, wherein the center frame section is pivotally connected to both of the left and right frame sections.

18. The method of claim 14, wherein the left gauge assembly includes a left linking member that spans between and operatively connects to the outer gauge wheel and to the inner gauge wheel, an actuation mechanism mounted on the left frame section and operably connected to the left linking member to thereby actuate the left linking member to correspondingly adjust a vertical height of at least one of the outer gauge wheel and the inner gauge wheel relative to the left linking member,
wherein the right gauge assembly includes a right linking member that spans between and operatively connects to the outer gauge wheel and to the inner gauge wheel, an actuation mechanism mounted on the right frame section and operably connected to the right linking member to thereby actuate the right linking member to correspondingly adjust a height of at least one of the outer gauge wheel and the inner gauge wheel relative to the right linking member;
wherein the actuating at least one of the left gauge assembly and the right gauge assembly includes operating the corresponding actuation mechanism to move the corresponding one of the left linking member or the right linking member.

19. The method of claim 18, wherein both of the left and right gauge assemblies include an outer crank arm operably attached to the outer gauge wheel and the horizontal member, and both of the left and right gauge assemblies also include an inner crank arm operably attached to the inner gauge wheel and the horizontal member; and
actuating the horizontal members to impart a vertical force to the outer gauge wheel to move the outer gauge wheel vertically and to impart a vertical force to the inner gauge wheel to move the inner gauge wheel vertically.

20. The method of claim 14, wherein the left gauge assembly includes a sensor supported on the left frame section for sensing a change in elevation of the outer gauge wheel and the inner gauge wheel relative to the left linking member, the right gauge assembly includes a sensor supported on the right frame section for sensing a change in elevation of the outer gauge wheel and the inner gauge wheel relative to the right linking member; and
further comprising:
detecting the change in elevation by a controller connected to the sensors; and
actuating at least one of the left and the right linking members to correspondingly adjust the elevation of at least one of the outer gauge wheel and the inner gauge wheel relative to the left and the right linking members.

\* \* \* \* \*